(12) United States Patent
Yang et al.

(10) Patent No.: US 6,906,934 B2
(45) Date of Patent: Jun. 14, 2005

(54) INTEGRATED START-UP CIRCUIT WITH REDUCED POWER CONSUMPTION

(75) Inventors: Ta-yung Yang, Milpitas, CA (US); Song-Yi Lin, Taipei (TW); Chien Yuan Lin, Pan-Chiao (TW)

(73) Assignee: System General Corp., Taipei Hsien (TW)

( * ) Notice: Subject to any disclaimer, the term of this patent is extended or adjusted under 35 U.S.C. 154(b) by 118 days.

(21) Appl. No.: 10/655,899

(22) Filed: Sep. 4, 2003

(65) Prior Publication Data

US 2005/0052886 A1 Mar. 10, 2005

(51) Int. Cl.[7] .............................................. H02M 1/12
(52) U.S. Cl. ..................... 363/49; 363/21.1; 363/56.01; 323/299; 323/901
(58) Field of Search .............................. 363/21.1, 21.18, 363/41, 56.01, 97, 49; 323/299, 315, 901

(56) References Cited

U.S. PATENT DOCUMENTS

| | | | |
|---|---|---|---|
| 5,200,886 A | 4/1993 | Schwarz et al. ............... | 363/49 |
| 5,262,933 A | 11/1993 | Shyi-Hon ..................... | 363/49 |
| 5,452,195 A | 9/1995 | Lehr et al. ..................... | 363/21 |
| 6,002,598 A | 12/1999 | Seinen et al. ................. | 363/49 |
| 6,069,805 A | 5/2000 | Anderson, Jr. ............... | 363/49 |
| 6,295,217 B1 * | 9/2001 | Yang et al. .................... | 363/49 |
| 6,480,402 B2 | 11/2002 | Adragna et al. .............. | 363/49 |
| 6,611,439 B1 * | 8/2003 | Yang et al. .................... | 363/41 |

* cited by examiner

*Primary Examiner*—Jessica Han
(74) *Attorney, Agent, or Firm*—J.C. Patents

(57) ABSTRACT

A switching power supply control-circuit according to the present invention uses bleeding resistors to charge a start-up capacitor and discharge an EMI filter. No extra discharge device is needed to accelerate the discharge of the input capacitor, since the start-up capacitor is charged up by the AC input source. A latch circuit of the power supply can be quickly reset after the AC input source is shut off. After the control-circuit begins to operate, the auxiliary winding of the transformer will power the control-circuit. To further reduce power consumption, the auxiliary winding generates a bias voltage to enable line-voltage detection. This allows the power supply to perform line-voltage detection and startup, without having to connect resistors or transistors to the input capacitor.

6 Claims, 3 Drawing Sheets

INTEGRATED START-UP CIRCUIT WITH REDUCED POWER CONSUMPTION

BACKGROUND OF THE INVENTION

1. Field of the Invention

The present invention generally relates to power supplies. More particularly, the present invention relates to the start-up circuit of a switching power supply.

2. Description of the Prior Art

Switching mode power supplies have largely replaced linear transformers and linear power supplies. Switching mode power supplies have grown in popularity, because they are more cost effective than linear power supplies. Furthermore, they offer several other advantages over linear power supplies, including reduced size, improved efficiency, and higher performance.

However, the start-up circuitry commonly used by switching mode power supplies can be substantially improved.

Several passive start-up devices known in the prior arts include U.S. Pat. No. 5,200,886 (Karl Schwarz, Horst Bartussek, Helmut Rettenmaier), U.S. Pat. No. 5,262,933 (Chen Shyi-Hon), U.S. Pat. No. 5,452,195 (Steffen Lehr, Volker Neiss, Jose I. Rodriguez-Duran, Rudolf Koblitz), and U.S. Pat. No. 6,069,805 (Wayne Anderson). The main drawback of these circuits is high power consumption.

Start-up circuits using high-voltage transistors are also well known in the prior arts. Examples of such start-up circuits are disclosed in U.S. Pat. No. 5,200,886 (Karl Schwarz, Horst Bartussek, Helmut Rettenmaier), U.S. Pat. No. 6,002,598 (Erwin G. R. Seinen, Naveed Majid), and U.S. Pat. No. 6,480,402 (Claudio Adragna, Claudio Spini). The drawback of these start-up circuits is also high power consumption because they require primary-side protection circuits.

In recent years, the manufacturers of computers and other types of equipment have been striving to comply with increasingly stringent environmental regulations. US and European regulations regarding electrical appliances strictly limit the amount of power that is consumed by supervising circuits and remote-control circuits. Reducing standby-mode power consumption has become a major concern. The start-up circuits of known power supplies are a major source of power loss. Furthermore, because traditional power supplies typically have high power consumption under light-load and zero-load conditions, it is increasingly difficult to manufacture electrical appliances that are compliant with environmental regulations.

FIG. 1 shows the input circuit of a prior-art switching mode power supply based on U.S. patent application Ser. No. 10/065,530 (Yang Ta-yung). In order to comply with safety regulations, a bleeding resistor 20 is used to discharge the energy that is stored in an EMI filter 10. A bridge rectifier 30 and an input capacitor 40 rectify and filter the AC input source $V_{AC}$ into a DC voltage $V_{IN}$. A transformer 50 is connected to the input capacitor 40. The transformer 50 is also connected in series with a power transistor 80. A control-circuit 100 is used to regulate the power supply. When the AC input source $V_{AC}$ is applied to the power supply, a start-up capacitor 43 will be charged via a start-up resistor 61. The start-up capacitor 43 provides a supply voltage $V_{CC}$ to power the control-circuit 100. The control-circuit 100 comprises an ON/OFF circuit 105, a line-voltage detector (LVD) 120, a latch circuit 150, a PWM (pulse width modulation) circuit 170, and a protection circuit 190. Once the supply voltage $V_{CC}$ provided by the start-up capacitor 43 exceeds a start-threshold voltage, the ON/OFF circuit 105 will enable the control-circuit 100 to begin pulse width modulation (PWM) operation.

After that, an auxiliary winding of the transformer 50 will power the control-circuit 100 via a diode 65. If the supply voltage $V_{CC}$ drops below a stop-threshold voltage, the ON/OFF circuit 105 will shut down the PWM operation of the control-circuit 100.

The PWM circuit 170 generates a PWM signal to switch the power transistor 80. When the power transistor 80 is switched on, the primary current of the transformer 50 will produce a current-sense voltage $V_S$ across a resistor 85. A line current $I_{IN}$, which can represents the line voltage information, is provided to the line-voltage detector 120. The line-voltage detector 120 accepts the line current $I_{IN}$ via a detection resistor 62 connected to the input capacitor 40.

The control-circuit 100 includes the protection circuit 190. The protection circuit 190 will terminate the PWM signal in response to various protection conditions, including over-voltage protection, over-temperature protection, and over-power protection. The line current $I_{IN}$ and the current-sense voltage $V_S$ are used to provide over-power protection. After the protection circuit 190 signals the latch circuit 150, the power supply will be locked in an off state. By disconnecting the AC input source $V_{AC}$ and discharging the input capacitor 40, the latch circuit 150 can be reset, so that it will be ready to restart the power supply. Unfortunately, the input capacitor 40 usually has a large capacitance that may take several minutes to completely discharge. To solve this problem, a resistor 63 and a high-voltage transistor 64 are included to accelerate the discharge of the input capacitor 40. However, the bleeding resistor 20, the start-up resistor 61, and the detection resistor 62 consume significant amounts of power. The power consumption of resistors 61 and 62 is equal to $V_{IN}^2/R$. If an increase in the magnitude of the AC input source occurs, the extra power loss will increase dramatically, especially with a 240V AC input.

Thus, the principle drawback of the power supply shown in FIG. 1 is higher power consumption. Another drawback is the need for extra discharge devices such as the resistor 63 and the high-voltage transistor 64. Adding these parts will further increase the cost of the power supply.

SUMMARY OF THE INVENTION

The present invention provides a control-circuit for a switching mode power supply. The control-circuit integrates a start-up circuit, a latch circuit and a line-voltage detector to reduce power consumption. The start-up circuit according to the present invention can start up the power supply using a low start-up current. Therefore, no extra discharge device is required and the cost of the power supply can be reduced.

Briefly, the control-circuit according to the present invention uses a bleeding resistor to discharge an EMI filter and to charge up a start-up capacitor. The start-up capacitor is charged up from the AC input terminals via the bleeding resistor. Because the voltage of the input capacitor does not affect the operation of the control-circuit, no extra discharge device is needed to accelerate the discharge of the input capacitor. The latch circuit can be quickly reset once the AC input is shut off. After the control-circuit starts to operate, an auxiliary winding of the transformer will provide energy to power the control-circuit.

A principle advantage of the control-circuit according to the present invention is reduced power consumption. No resistors or transistors need to be connected to the input capacitor for start-up and line-voltage detection, since the auxiliary winding of the transformer generates a bias voltage for line-voltage detection. Furthermore, an ON/OFF circuit can detect the supply voltage and start PWM operation with a smaller start-up current than most prior-art power supplies.

The present invention integrates the start-up circuit, the latch circuit, and the line-voltage detector to reduce power consumption. Moreover, no extra device is required to accelerate the discharge of the input capacitor. Because of this, the control-circuit for a switching mode power supply according to the present invention can be built at a lower manufacturing cost than prior-art power supplies.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
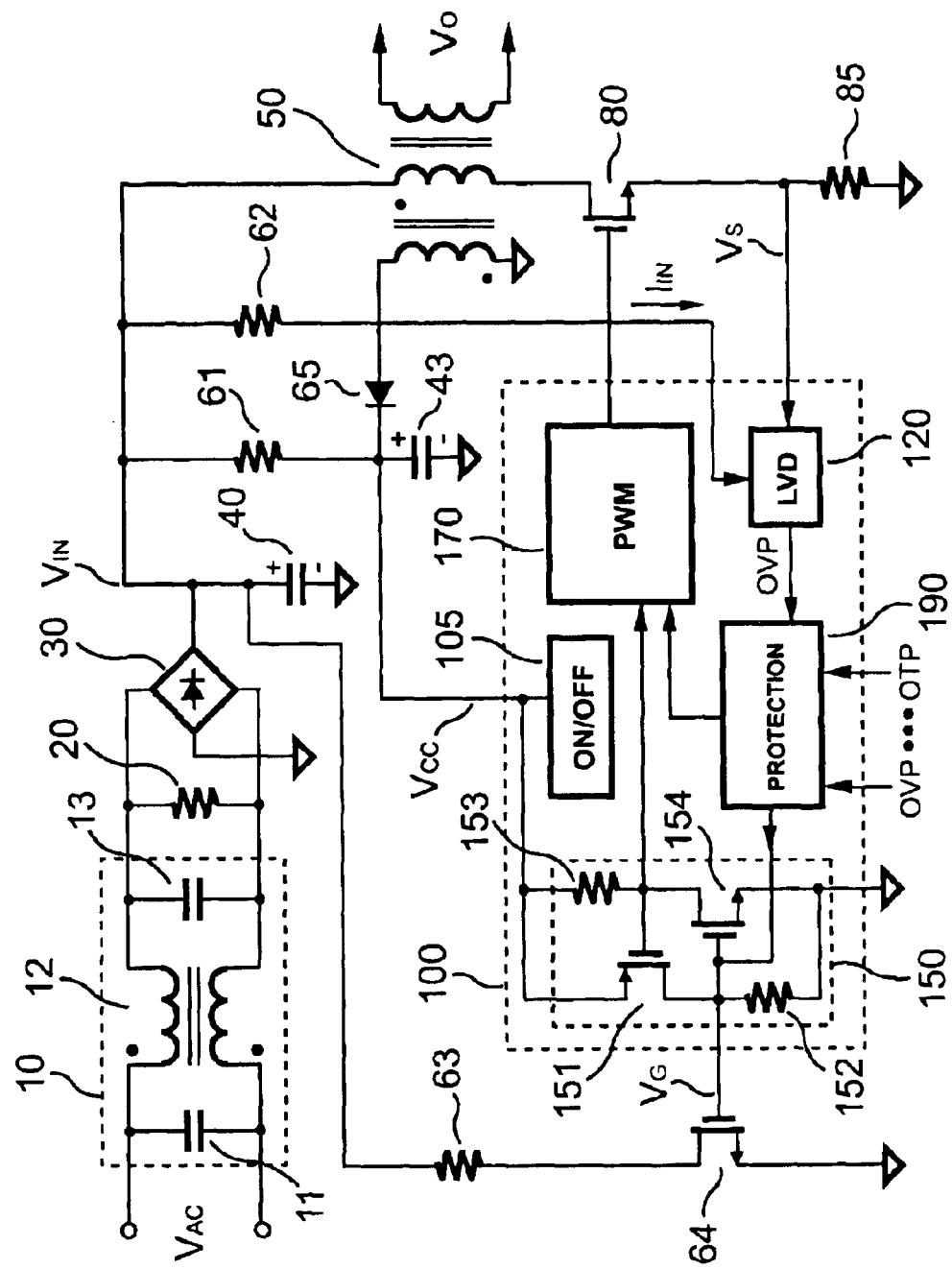
FIG. 1 shows an input circuit of a traditional switching mode power supply.
Figure 2:
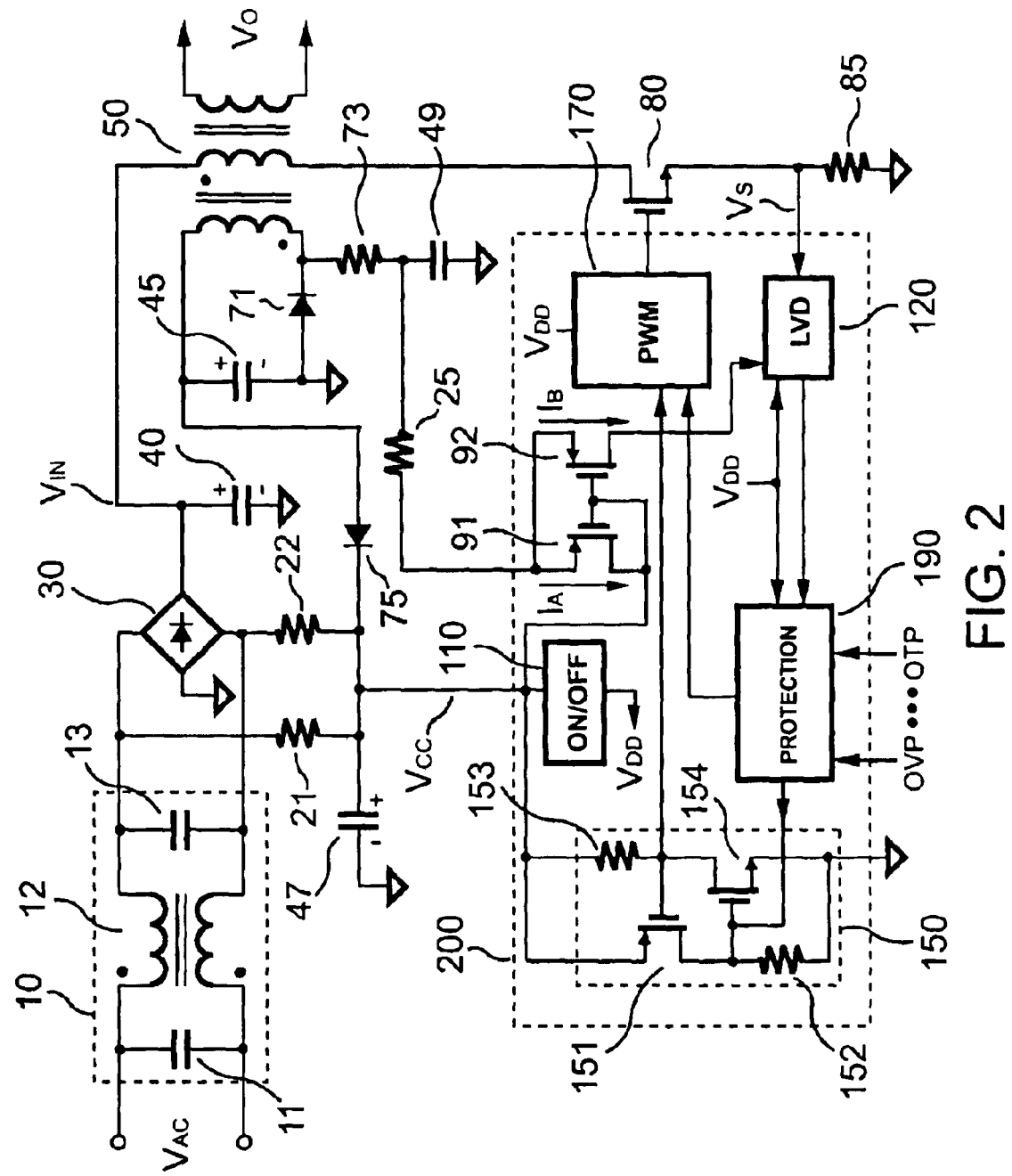
FIG. 2 shows an input circuit of a power supply according to the present invention.

FIG. 2 shows an input circuit of a power supply according to the present invention. An AC input source $V_{AC}$ is supplied to a first AC input and a second AC input of a bridge rectifier 30 via an EMI filter 10. An output of the bridge rectifier 30 is connected to an input capacitor 40 to produce a DC input voltage $V_{IN}$. A transformer 50 is coupled to the input capacitor 40. A power transistor 80 is used for switching the transformer 50.

The power supply includes a control-circuit 200, which comprises an ON/OFF circuit 110, a line-voltage detector (LVD) 120, a latch circuit 150, a PWM circuit 170, a protection circuit 190, and two mirror transistors 91 and 92. A supply voltage $V_{CC}$ supplies power to the control-circuit 200. The ON/OFF circuit 110 starts up PWM operation whenever the supply voltage $V_{CC}$ exceeds a start-threshold voltage. When the supply voltage $V_{CC}$ drops below a stop-threshold voltage, the ON/OFF circuit 110 will disable PWM operation.

The PWM circuit 170 cooperates with the line-voltage detector 120 and the protection circuit 190 to control PWM operation. The PWM circuit 170 regulates the output voltage by producing a PWM signal to switch the power transistor 80. When the power transistor 80 is switched on, the primary current of the transformer 50 will produce a current-sense voltage $V_S$ across a resistor 85. The current-sense voltage $V_S$ is supplied to the line-voltage detector 120, to provide an over-power signal to the protection circuit 190. The protection circuit 190 provides the power supply with over-voltage, over-temperature, and over-power protection functions. The latch circuit 150 is connected in parallel with a start-up capacitor 47. Once the protection circuit 190 signals the latch circuit 150, the power supply will be locked up in an off state.

A first bleeding resistor 21 is connected from the first AC input of the bridge rectifier 30 to the start-up capacitor 47. A second bleeding resistor 22 is connected from the second AC input of the bridge rectifier 30 to the start-up capacitor 47. To ensure safe operation, the first bleeding resistor 21 and the second bleeding resistor 22 will discharge the EMI filter 10 after the AC input source $V_{AC}$ is turned off. Once the power supply is turned on, the input capacitor 40 will be charged up to the DC input voltage $V_{IN}$ within a few AC cycles. In the meantime, the AC input source $V_{AC}$ will begin to charge the start-up capacitor 47 via the first bleeding resistor 21, the second bleeding resistor 22, and the bridge rectifier 30.

When the supply voltage $V_{CC}$ of the start-up capacitor 47 exceeds the start-threshold voltage, the ON/OFF circuit 110 will enable PWM operation. Since the bleeding resistors 21 and 22 are connected to the AC input terminals, the start-up capacitor 47 will be charged by the AC input source. After PWM operation starts, an auxiliary winding of the transformer 50 will power the supply voltage $V_{CC}$ via a diode 71 and a diode 75.

A first terminal of the auxiliary winding is connected to a capacitor 45. The first terminal of the auxiliary winding is further connected to an anode of the diode 75. A cathode of the diode 75 is connected to the start-up capacitor 47 to power the supply voltage $V_{CC}$. A second terminal of the auxiliary winding is connected to a cathode of the diode 71. An anode of the diode 71 is grounded. The second terminal of the auxiliary winding is further connected to a resistor 73. The resistor 73 is connected to a capacitor 49 to produce a bias voltage. The bias voltage is converted into a bias current via a resistor 25. The bias current drives a source of the mirror transistor 91 and a source of the mirror transistor 92. A gate of the mirror transistor 91, a gate of the mirror transistor 92, and a drain of the mirror transistor 91 are tied together. In response to the bias current, the drain of the mirror transistor 91 generates a first proportional current $I_A$. The first proportional current $I_A$ and the supply voltage $V_{CC}$ are both supplied to the start-up capacitor 47. A drain of the mirror transistor 92 provides a second proportional current $I_B$ to the line-voltage detector 120 for line-voltage detection. Since the bias voltage is much lower than the DC input voltage $V_{IN}$, the power consumption of the resistor 25 will not be significant. To further reduce power consumption, most of the current used for line-voltage detection is recycled to provide the supply voltage $V_{CC}$.

When the AC input source $V_{AC}$ is shut off, the bleeding resistors 21 and 22 will discharge the EMI filter 10. Discharging the start-up capacitor 47 can quickly reset the latch circuit 150. However, the voltage across the input capacitor 40 does not affect the operation of the latch circuit 150. Therefore, no discharge device is needed to accelerate the discharge of the input capacitor 40.

Figure 3:
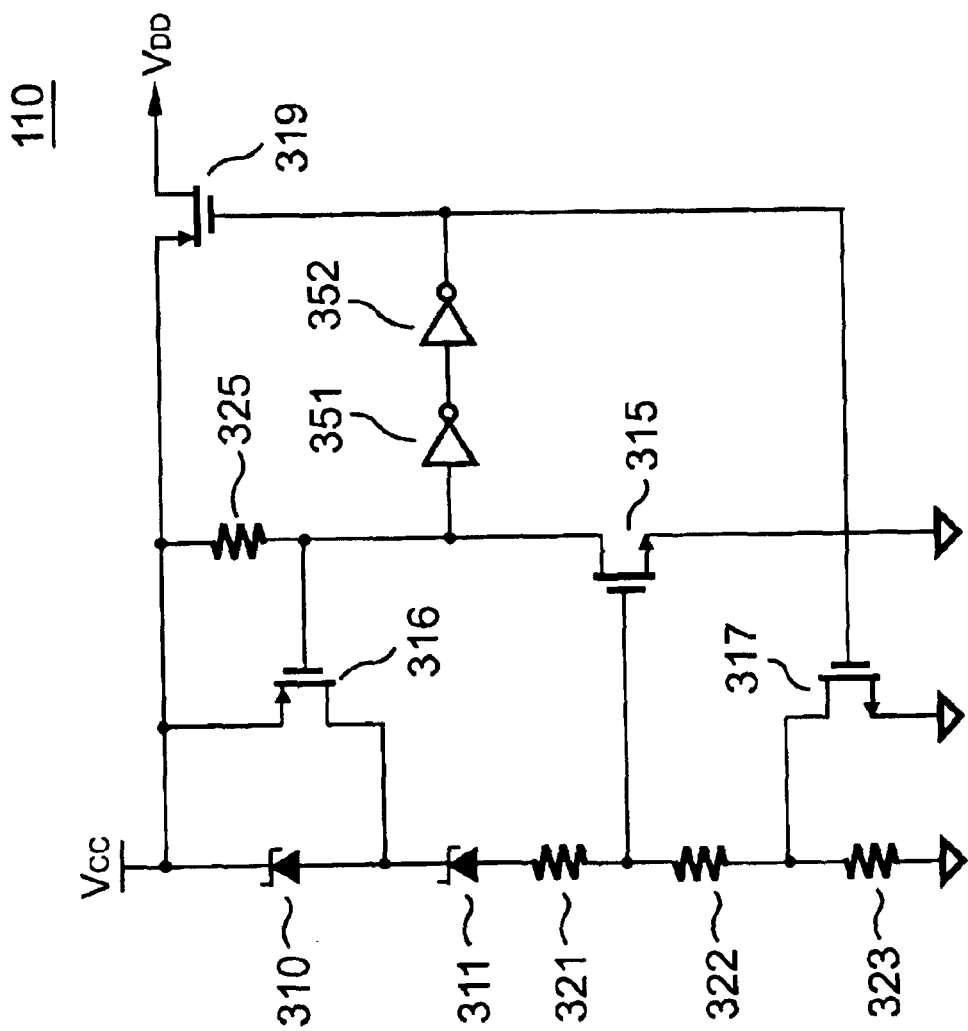
FIG. 3 shows an ON/OFF circuit according to the present invention.

FIG. 3 shows the ON/OFF circuit 110 according to one embodiment of the present invention. The ON/OFF circuit 110 is used to detect the magnitude of the supply voltage $V_{CC}$ and enable PWM operation, while consuming very little start-up current. In the ON/OFF circuit 110, two zener diodes 310 and 311 are connected in series with three resistors 321, 322, and 323. The supply voltage $V_{CC}$ is supplied to a cathode of the zener diode 310. The resistor 323 is connected to the ground reference. A gate of an n-transistor 315 is connected to a junction of the resistors 321 and 322. A source of the n-transistor 315 is connected to the ground reference. A drain of the n-transistor 315 is connected to a gate of a p-transistor 316. A source and a drain of the p-transistor 316 are connected in parallel with the zener diode 310. A resistor 325 is connected between the source of the p-transistor 316 and the gate of the p-transistor 316. The drain of the n-transistor 315 is further connected to an input of an inverter 351. An output of the inverter 351 is connected to an input of an inverter 352.

An output of the inverter 352 drives a gate of a p-transistor 319. A source of the p-transistor 319 is supplied with the supply voltage $V_{CC}$. A drain of the p-transistor 319 produces a power voltage $V_{DD}$. As the p-transistor 319 is turned on, the power voltage $V_{DD}$ will be supplied to the PWM circuit 170, the protection circuit 190, and the line-voltage detector 120. This will start PWM operation. The output of the inverter 352 further drives a gate of an n-transistor 317. A drain of the n-transistor 317 is connected to a junction of the resistor 322 and the resistor 323. A source of the n-transistor 317 is connected to the ground reference. The n-transistor 317 is turned on whenever the n-transistor 315 is turned off and vice-versa. Once the supply voltage $V_{CC}$ exceeds the sum of the voltages of the zener diodes 310 and 311, a current will flow into the resistors 321 and 322. This will generate an entry voltage at the gate of the n-transistor 315. When the entry voltage exceeds the gate-threshold voltage of the n-transistor 315, the p-transistor 316 will be turned on.

Turning on the p-transistor 316 will short-circuit the zener diode 310 and increase the entry voltage. In the meantime, turning on the p-transistor 315 will turn off the n-transistor 317. A turn-off signal will propagate through the inverters 351 and 352. Turning off the n-transistor 317 will form a positive feedback signal, to switch on the n-transistor 315. The start-threshold voltage of the ON/OFF circuit 110 is the sum of the voltage of the zener diode 310, the voltage of the zener diode 311, and the gate-threshold voltage of the n-transistor 315. The stop-threshold voltage is the sum of the voltage of the zener diode 311 and the gate-threshold voltage of the n-transistor 315. When the supply voltage $V_{CC}$ drops below the stop-threshold voltage, this will turn off the n-transistor 315, and the p-transistors 316 and 319. Meanwhile, the n-transistor 317 will be turned on and PWM operation will be halted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:

1. An integrated start-up circuit comprising:
   a start-up capacitor, for providing a supply voltage for powering a control-circuit of the power supply, wherein said start-up capacitor is coupled to a supply voltage terminal of said control-circuit;
   a first bleeding resistor, connected from a first AC input of a bridge rectifier to said start-up capacitor;
   a second bleeding resistor, connected from a second AC input of said bridge rectifier to said start-up capacitor; and
   an ON/OFF circuit, for controlling PWM operation, wherein said ON/OFF circuit will enable PWM operation whenever said supply voltage of said start-up capacitor exceeds a start-threshold voltage, and wherein said ON/OFF circuit will disable PWM operation after the supply voltage drops below a stop-threshold voltage.

2. The integrated start-up circuit as claimed in claim 1, wherein said first bleeding resistor and said second bleeding resistor discharge an EMI filter of the power supply whenever an AC input source of the power supply is turned off, wherein said AC input source will charge up said start-up capacitor whenever said AC input source is turned on, and wherein said AC input source will charge up said start-up capacitor via said first bleeding resistor, said second bleeding resistor, and said bridge rectifier.

3. The integrated start-up circuit as claimed in claim 1 further comprising:
   a latch circuit, connected in parallel with said start-up capacitor, wherein the power supply will be locked up in an off-state whenever said latch circuit is enabled by a protection circuit;
   a line-voltage detector, for detecting the line voltage of the power supply and providing over-power protection to the power supply during PWM operation;
   an auxiliary transformer winding of the power supply, having a first terminal and a second terminal;
   an auxiliary capacitor, connected to said first terminal of said auxiliary transformer winding;
   a first diode, having an anode terminal and a cathode terminal, wherein said cathode terminal of said first diode is connected to said second terminal of said auxiliary transformer winding, and wherein said anode terminal of said first diode is connected to the ground reference; and
   a second diode, having an anode terminal and a cathode terminal, wherein said anode terminal of said second diode is connected to said auxiliary capacitor, and wherein said cathode terminal of said second diode is connected to said start-up capacitor.

4. The integrated start-up circuit as claimed in claim 1 further comprising:
   a detection capacitor, for providing a bias voltage;
   a resistor, connected from said cathode of said first diode to said detection capacitor;
   a detection resistor, for converting said bias voltage to a bias current;
   a first-mirror transistor, for producing a first-mirror current from said bias current; and
   a second-mirror transistor, for providing a second-mirror current to said line-voltage detector, wherein a source of said first-mirror transistor and a source of said second-mirror transistor are tied together and are connected to said detection capacitor via said detection resistor, wherein a gate of said first-mirror transistor, a gate of said second-mirror transistor, and a drain of said first-mirror transistor are tied together, wherein said drain of said first-mirror transistor is connected to said start-up capacitor, and wherein a drain of said second-mirror transistor supplies said second-mirror current to said line-voltage detector.

5. The integrated start-up circuit as claimed in claim 1, wherein the ON/OFF circuit further comprises:
   a first resistor, a second resistor, and a third resistor;
   a first zener diode and a second zener diode connected in series with said first resistor, said second resistor, and said third resistor, wherein said first zener diode is connected to the supply voltage terminal and said third resistor is connected to the ground reference;
   a first n-transistor, wherein a gate of said first n-transistor is connected to a junction of said first resistor and said second resistor, and wherein a source of said first n-transistor is connected to the ground reference; and
   a first p-transistor, wherein a drain of said first n-transistor is connected to a gate of said first p-transistor, and wherein a source and a drain of said first p-transistor are connected in parallel with said first zener diode.

6. The integrated start-up circuit as claimed in claim 5, wherein the ON/OFF circuit further comprises:

a fourth resistor connected from said gate of said first p-transistor to the supply voltage terminal;

a second p-transistor, wherein a source of said second p-transistor is connected to the supply voltage terminal, and wherein a drain of said second p-transistor produces a power voltage;

a first inverter and a second inverter, wherein said drain of said first n-transistor is further connected to an input of said first inverter, wherein an output of said first inverter is connected to an input of said second inverter, wherein an output of said second inverter drives a gate of said second p-transistor, and wherein PWM operation starts after said second p-transistor is turned on; and a second n-transistor, wherein said output of said second inverter drives a gate of said second n-transistor, wherein a drain of said second n-transistor is connected to a junction of said second resistor and said third resistor, and wherein a source of said second n-transistor is connected to the ground reference.

* * * * *